United States Patent
Weng et al.

(10) Patent No.: US 10,409,868 B2
(45) Date of Patent: *Sep. 10, 2019

(54) BLENDING SEARCH RESULTS ON ONLINE SOCIAL NETWORKS

(71) Applicant: Facebook, Inc., Menlo Park, CA (US)

(72) Inventors: Ching-Chih Weng, Union City, CA (US); Alessandro Presta, San Francisco, CA (US); Chun-Yang Chen, Sunnyvale, CA (US); Po-Lung Chen, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/698,287

(22) Filed: Sep. 7, 2017

(65) Prior Publication Data

US 2017/0371966 A1    Dec. 28, 2017

Related U.S. Application Data

(63) Continuation of application No. 14/454,826, filed on Aug. 8, 2014, now Pat. No. 9,792,364.

(51) Int. Cl.
| | | |
|---|---|---|
| *G06F 7/00* | (2006.01) | |
| *G06F 17/30* | (2006.01) | |
| *G06F 16/951* | (2019.01) | |
| *G06Q 50/00* | (2012.01) | |
| *G06Q 30/02* | (2012.01) | |

(52) U.S. Cl.
CPC ....... *G06F 16/951* (2019.01); *G06Q 30/0251* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 2009/0171722 A1* | 7/2009 | Roberts | G06Q 10/06393 705/7.39 |
| 2013/0191416 A1* | 7/2013 | Lee | G06F 17/30979 707/771 |
| 2013/0246404 A1* | 9/2013 | Annau | G06F 17/30672 707/723 |

* cited by examiner

*Primary Examiner* — Tuan A Pham
(74) *Attorney, Agent, or Firm* — Baker Botts L.L.P.

(57) ABSTRACT

In one embodiment, a method includes receiving a search query, searching a multiple verticals to identify multiple of sets of objects in each respective vertical that match the search query, wherein each vertical stores objects of a particular object-type, generating a set of blended search results by blending the sets of identified objects from each vertical, determining that greater than a threshold proportion of objects in the set of blended search results are from a first vertical, adding at least one object from a second vertical to the set of blended search results in responsive to determining that greater than the threshold proportion of objects in the blended search results are from the first vertical, wherein the second vertical is different from the first vertical; and sending, responsive to the search query, the set of blended search results for display.

20 Claims, 7 Drawing Sheets

BLENDING SEARCH RESULTS ON ONLINE SOCIAL NETWORKS

PRIORITY

This application is a continuation under 35 U.S.C. § 120 of U.S. patent application Ser. No. 14/454,826, filed 8 Aug. 2014, which is incorporated herein by reference.

TECHNICAL FIELD

This disclosure generally relates to social graphs and performing searches for objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a user of a social-networking system may send a search query to the social-networking system. In response to the search query, the social-networking system may access a plurality of verticals (or, data stores) to search for one or more objects from each vertical that match the search query. In particular embodiments, each vertical may store objects of a particular object-type (e.g., user, photo, post, event, application, etc.). In each vertical, a set of objects that substantially match the search query may be identified, and for each set of identified objects from each vertical, a vertical score may be calculated. The identified objects from each vertical may then be ranked or sorted in order of their vertical scores.

The sets of identified objects may then be aggregated, or "blended," into a set of blended search results. In particular embodiments, blending the sets of identified objects may include an iterative process performed at least a threshold number of iterations or until all the identified objects have been blended. Each iteration of the blending process may include determining a blender score for each top-ranked identified object from each vertical and then selecting the object with the highest blender score. The identified object with the highest blender score is added to set of blended search results and removed from its set of identified objects, and the second-ranked identified object from that set is then promoted to become the top-ranked identified object of that set. The blending process may repeat by determining a blender score for the newly added top-ranked identified object and adding the object with the highest blender score to the set of blended search results. In particular embodiments, the objects of the set of blended search results may be arranged in an order in which they were added to the set of blended search results. In particular embodiments, identified objects from each set of identified objects may have a relative order in a set of blended search results that is the same as their order in their respective set of identified objects. In particular embodiments, after forming a set of blended search results, social-networking system may make one or more adjustments to blender scores or to the rankings or the composition of a set of blended search results before presentation to the querying user.

In particular embodiments, social-networking system 160 may send, responsive to the search query, a set of blended search results to the user for display. In particular embodiments, each search result may include a reference to a corresponding identified object. The search results may be presented to the querying user as a search-results page.

The embodiments disclosed above are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

System Overview

Figure 1:
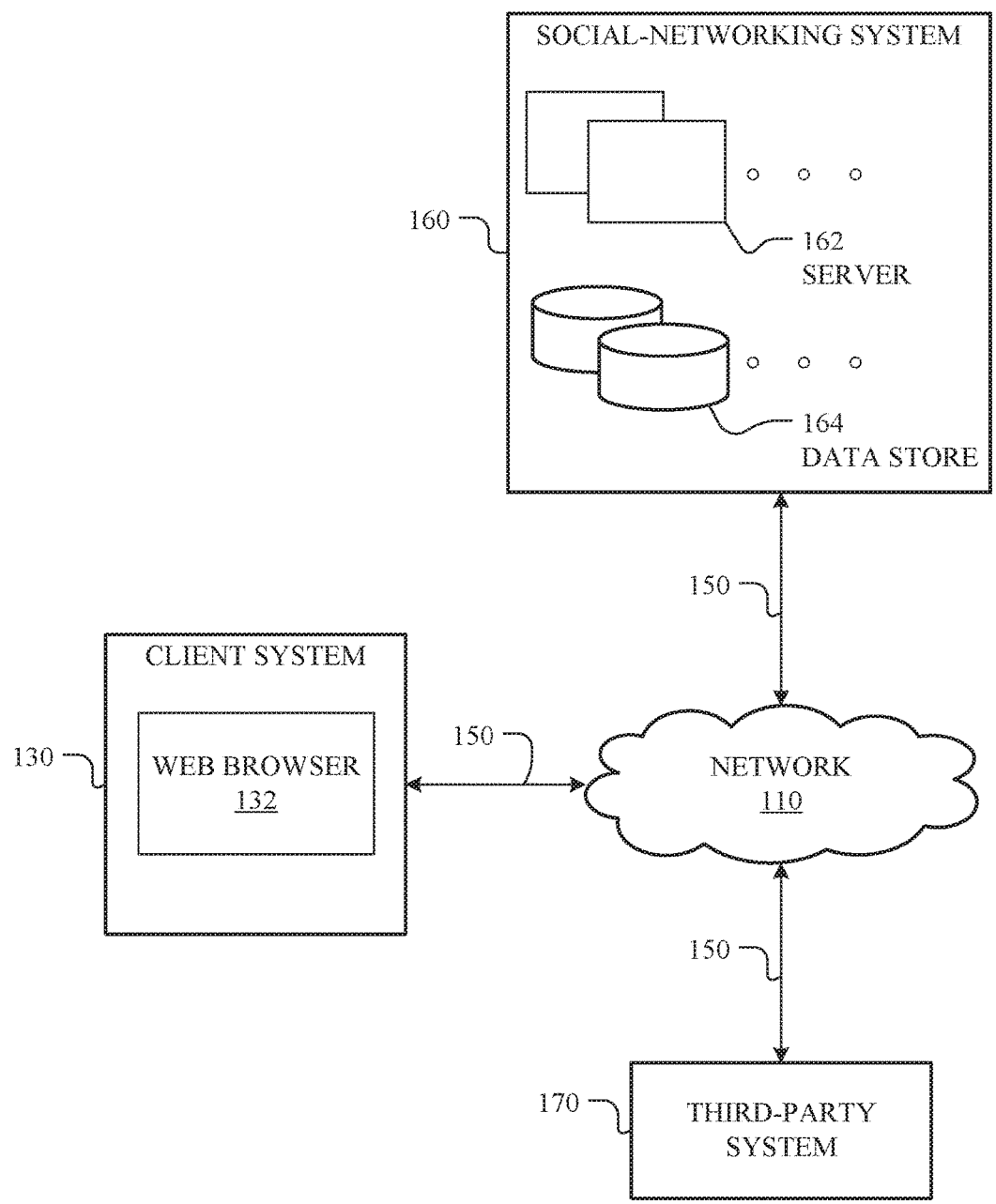
FIG. 1 illustrates an example network environment associated with a social-networking system.

FIG. 1 illustrates an example network environment 100 associated with a social-networking system. Network environment 100 includes client system 130, social-networking system 160, and third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. Client system 130 may enable a network user at client system 130 to access network 110. Client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable client system 130, social-networking system 160, or third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, third-party system 170 may include a third-party content object provider. A third-party content object provider may include one or more sources of content objects, which may be communicated to client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to client system 130. Information may be pushed to client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
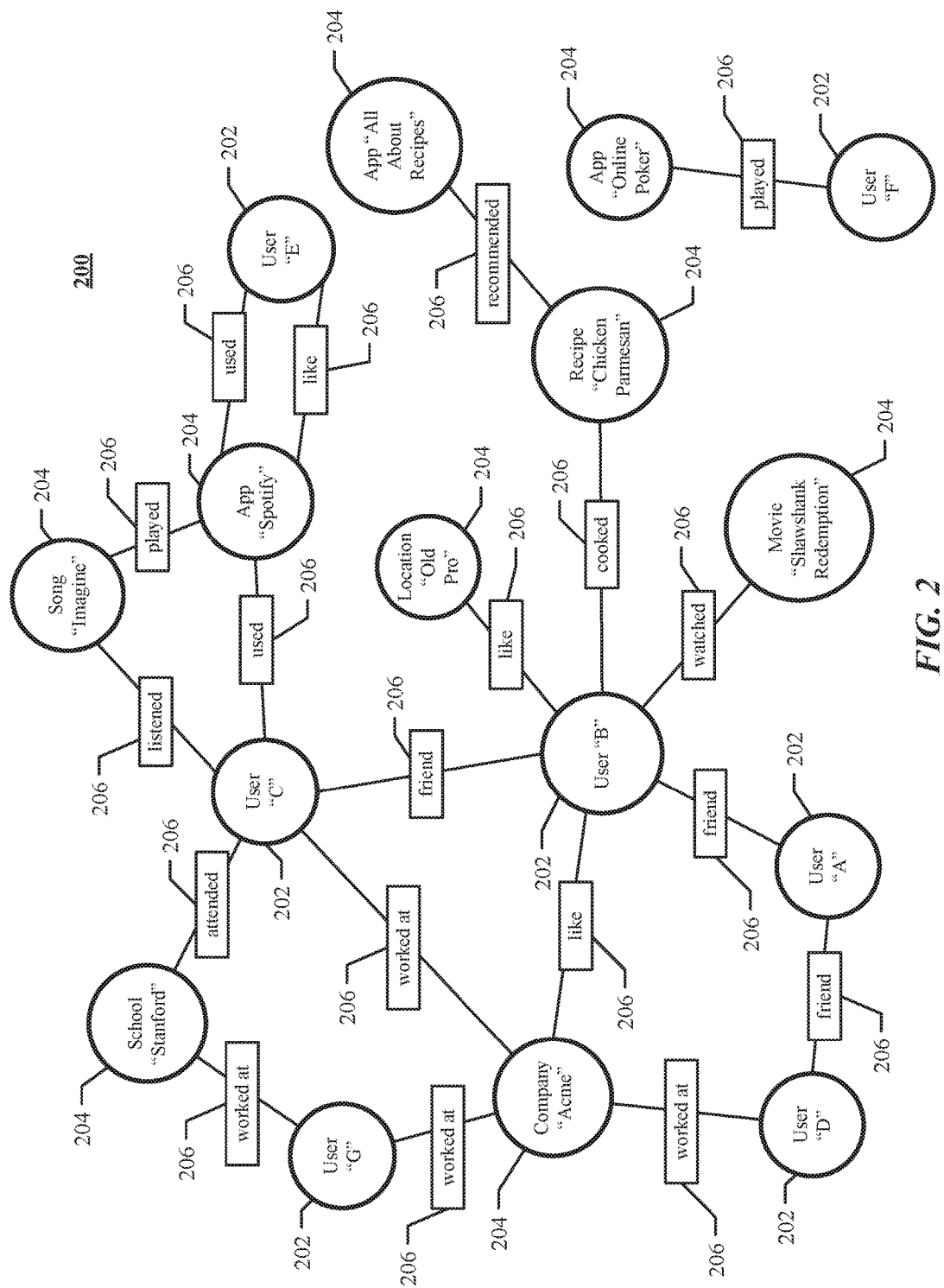
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-networking system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Indexing Based on Object-Type

Figure 3:
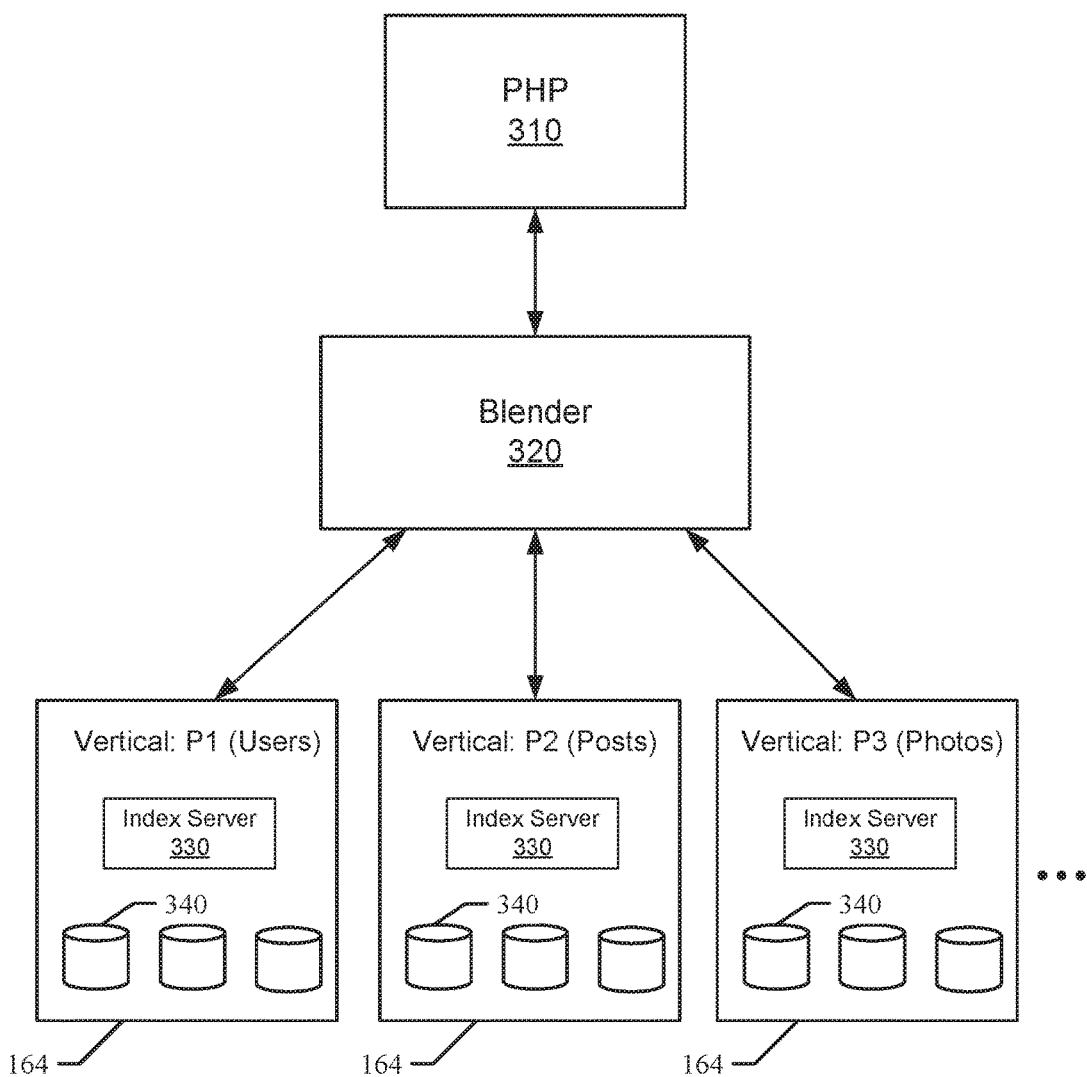
FIG. 3 illustrates an example partitioning for storing objects of a social-networking system.

FIG. 3 illustrates an example partitioning for storing objects of social-networking system 160. A plurality of data stores 164 (which may also be called "verticals") may store objects of social-networking system 160. The amount of data (e.g., data for a social graph 200) stored in the data stores may be very large. As an example and not by way of limitation, a social graph used by Facebook, Inc. of Menlo Park, Calif. can have a number of nodes in the order of $10^8$, and a number of edges in the order of $10^{10}$. Typically, a large collection of data such as a large database may be divided into a number of partitions. As the index for each partition of a database is smaller than the index for the overall database, the partitioning may improve performance in accessing the database. As the partitions may be distributed over a large number of servers, the partitioning may also improve performance and reliability in accessing the database. Ordinarily, a database may be partitioned by storing rows (or columns) of the database separately. In particular embodiments, a database maybe partitioned based on object-types. Data objects may be stored in a plurality of partitions, each partition holding data objects of a single object-type. In particular embodiments, social-networking system 160 may retrieve search results in response to a search query by submitting the search query to a particular partition storing objects of the same object-type as the search query's expected results. Although this disclosure describes storing objects in a particular manner, this disclosure contemplates storing objects in any suitable manner.

In particular embodiments, each vertical 164 of the plurality of verticals 164 may store objects of a particular object-type. In particular embodiments, each vertical 164 may store one or more objects associated with the online social network. In particular embodiments, a vertical 164 of the plurality of verticals 164 may be a users vertical 164 storing one or more user-profile pages of the online social network, each user-profile page corresponding to a user node 202 of the plurality of nodes. In particular embodiments, each object may correspond to a particular node of a social graph 200. An edge 206 connecting the particular node and another node may indicate a relationship between objects corresponding to these nodes. In addition to storing objects, a particular data store may also store social-graph information relating to the object. Alternatively, social-graph information about particular objects may be stored in a different data store from the objects. Social-networking system 160 may update the search index of the data store based on newly received objects, and relationships associated with the received objects.

In particular embodiments, each data store 164 may be configured to store objects of a particular one of a plurality of object-types in respective data storage devices 340. As an example and not by way of limitation, the object-types stored by a vertical 164 may be a user, a photo, a post, a comment, a message, an event, an event listing, a webpage, a page, an application, a location, a user-profile page, a concept-profile page, a user group, an audio file, a video, an offer/coupon, or another suitable type of object. Although this disclosure describes particular types of objects, this disclosure contemplates any suitable types of objects. As an example and not by way of limitation, a users vertical P1 illustrated in FIG. 3 may store user objects. Each user object stored in the users vertical P1 may comprise an identifier (e.g., a character string), a user name, and a profile picture for a user of the online social network. Social-networking system 160 may also store in the users vertical P1 information associated with a user object such as language, location, education, contact information, interests, relationship status, a list of friends/contacts, a list of family members, privacy settings, and so on. As an example and not by way of limitation, a posts vertical P2 illustrated in FIG. 3 may store post objects. Each post object stored in the posts vertical P2 may comprise an identifier, a text string for a post posted to social-networking system 160. Social-networking system 160 may also store in the posts vertical P2 information associated with a post object such as a time stamp, an author, privacy settings, users who like the post, a count of likes, comments, a count of comments, location, and so on. As an example and not by way of limitation, a photos vertical P3 may store photo objects (or objects of other media types such as video or audio). Each photo object stored in the photos vertical P3 may comprise an identifier and a photo. Social-networking system 160 may also store in the photos vertical P3 information associated with a photo object such as a time stamp, an author, privacy settings, users who are tagged in the photo, users who like the photo, comments, and so on. In particular embodiments, each data store may also be configured to store information associated with each stored object in data storage devices 340.

In particular embodiments, objects stored in each vertical 164 may be indexed by one or more search indices. The search indices may be hosted by respective index server 330 comprising one or more computing devices (e.g., servers). The index server 330 may update the search indices based on data (e.g., a photo and information associated with a photo) submitted to social-networking system 160 by users or other processes of social-networking system 160 (or a third-party system). The index server 330 may also update the search indices periodically (e.g., every 24 hours). The index server 330 may receive a query comprising a search term and access and retrieve search results from one or more search indices corresponding to the search term. In some embodiments, a vertical 164 corresponding to a particular object-type may comprise a plurality of physical or logical partitions, each comprising respective search indices.

In particular embodiments, social-networking system 160 may receive a search query from a PHP: Hypertext Preprocessor (PHP) process 310. The PHP process 310 may comprise one or more computing processes hosted by one or more servers 162 of social-networking system 160. The search query may be a text string or a search query submitted to the PHP process by a user or another process of social-networking system 160 (or third-party system 170). In particular embodiments, in response to a search query, blender 320 may receive sets of identified objects from verticals 164 and may combine, aggregate, or "blend" the sets of identified objects into a set of blended search results that may be returned in response to the search query.

More information on indexes and search queries may be found in U.S. patent application Ser. No. 13/560,212, filed 27 Jul. 2012, U.S. patent application Ser. No. 13/560,901, filed 27 Jul. 2012, and U.S. patent application Ser. No. 13/723,861, filed 21 Dec. 2012, each of which is incorporated by reference.

Typeahead and Search Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested webpage (such as, for example, a user-profile page, a concept-profile page, a search-results webpage, or another suitable page of the online social network), which may be hosted by or accessible in social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. More information on typeahead processes may be found in U.S. patent application Ser. No. 12/763,162, filed 19 Apr. 2010, and U.S. patent application Ser. No. 13/556,072, filed 23 Jul. 2012, each of which is incorporated by reference.

Figure 4:
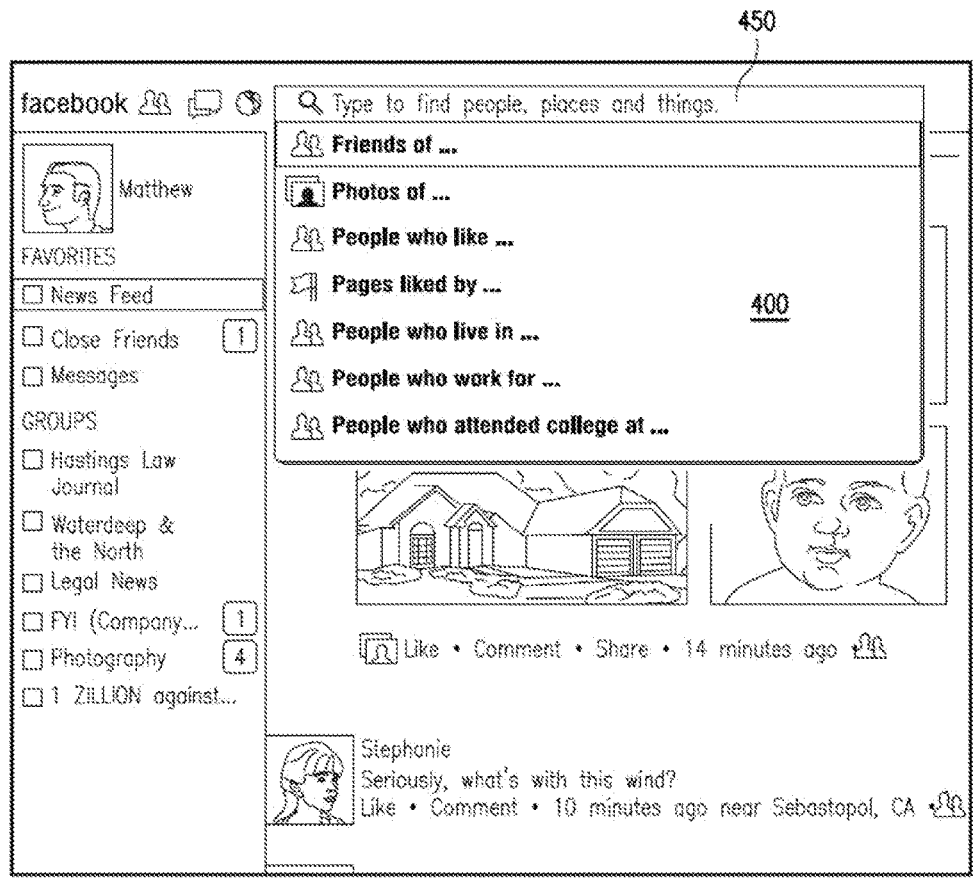
FIG. 4 illustrates an example webpage of an online social network.

FIG. 4 illustrates an example webpage of an online social network. In particular embodiments, a user may submit a query to the social-network system 160 by inputting text into query field 450. A user of an online social network may search for particular content objects (hereinafter "objects") or content-object-types (hereinafter "object-types") associated with the online social network (e.g., users, concepts, webpages, external content or resources) by providing a short phrase describing the object or object-type, often referred to as a "search query," to a search engine. The query may be a text query and may comprise one or more character strings (which may include one or more n-grams). In general, a user may input any character string comprising one or more characters into query field 450 to search for objects on social-networking system 160 that substantially match the character string. Social-networking system 160 may then search one or more verticals 164 to identify objects matching the query. The search engine may conduct a search based on the query using various search algorithms and generate search results that identify objects (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified objects may include, for example, social-graph elements (i.e., user nodes 202, concept nodes 204, edges 206), profile pages, external webpages, or any suitable combination thereof. Social-networking system 160 may then generate a search-results webpage with search results corresponding to the identified objects and send the search-results webpage to the user. In particular embodiments, the search engine may limit its search to objects associated with the online social network. However, in particular embodiments, the search engine may also search for objects associated with other sources, such as third-party system 170, the internet or World Wide Web, or other suitable sources. Although this disclosure describes querying social-networking system 160 in a particular manner, this disclosure contemplates querying social-networking system 160 in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/732,101, filed 31 Dec. 2012, each of which is incorporated by reference.

Figure 5:
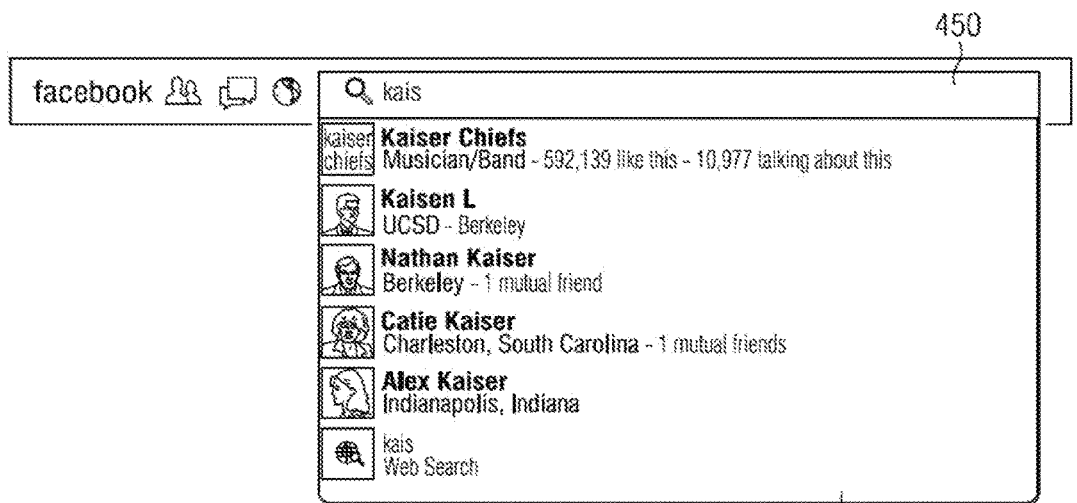
FIG. 5 illustrates an example query of the online social network.

FIG. 5 illustrates an example query of the online social network. In particular embodiments, in response to a search query input received from a first user (i.e., the querying user), social-networking system 160 may access one or more verticals 164 to search for objects that match the search query input. The search query input may comprise a character string of one or more characters inputted by the querying user, for example, into a query field 450.

In particular embodiments, social-networking system 160 may generate one or more references to the identified objects. These references may be generated as typeahead suggestions to be displayed to the user in response to the search query input from the querying user. The typeahead suggestions (e.g., the reference to the identified nodes or their corresponding profile pages) may be scored (or ranked) and presented to the user according to their relative degrees of relevance to the search query input, as determined by the particular search algorithm used to generate the typeahead suggestions. The typeahead suggestions may also be scored and presented to the user according to their relative degree of relevance to the user. In particular embodiments, the typeahead suggestions may be scored or ranked by a particular scoring/ranking algorithm implemented by the search engine. As an example and not by way of limitation, typeahead suggestions that are more relevant to the search query or to the user may be scored higher than the resources that are less relevant. The way relevance is determined may be modified based on the search intent identified by social-networking system 160. In particular embodiments, social-networking system 160 may rank the one or more typeahead suggestions. Typeahead suggestions may be ranked, for example, based on the score determined for the typeahead suggestion. The most relevant result (e.g., highest/best scoring) may be ranked highest, with the remaining results having lower ranks commensurate with their score/relevance, such that the least relevant result is ranked lowest. Although this disclosure describes generating particular references to identified objects in a particular manner, this disclosure contemplates generating any suitable references to identified object in any suitable manner.

In particular embodiments, social-networking system 160 may send to the querying user one or more references to one or more of the identified objects, respectively. As the user enters the search query input as a character string into a query field 450, the typeahead processes described previously may automatically send the references to the identified objects as typeahead suggestions. The typeahead suggestions may be sent to the user, for example, in the form of a list of links displayed in a drop-down menu 400 (which may be associated with the query field 450), each link being associated with a different webpage comprising the identified objects. In particular embodiments, each link in the typeahead suggestions may comprise a Uniform Resource Locator (URL) that specifies where the corresponding webpage comprising the referenced content object is located and the mechanism for retrieving it. Social-networking system 160 may then send the typeahead suggestions to the web browser 132 on the user's client system 130. The user may then click on the URL links or otherwise select the object from the drop-down menu 400 to access the object from social-networking system 160 or from an external system (such as, for example, third-party system 170), as appropriate. In particular embodiments, each typeahead suggestion may include a link to a profile page and a description or summary of the profile page (or the node corresponding to that page). When generating the typeahead suggestions, social-networking system 160 may generate one or more snippets for each typeahead suggestion, where the snippets are contextual information about the target of the typeahead suggestion (i.e., contextual information about the social-graph entity, profile page, or other objects corresponding to the particular typeahead suggestion). In particular embodiments, social-networking system 160 may only send typeahead suggestions having a score/rank over a particular threshold score/rank. As an example and not by way of limitation, social-networking system 160 may only send the top ten suggestions back to the querying user in response to a particular search query input. Although this disclosure describes sending particular references to identified objects in a particular manner, this disclosure contemplates sending any suitable references to identified objects in any suitable manner.

In the example of FIG. 5, in response to the querying user inputting four characters, social-networking system 160 searches verticals 164 (e.g., users verticals 164, photos verticals 164, posts verticals 164, pages verticals 164, etc.) to identify objects that match the four characters. Based on the identified objects, social-networking system 160 may then send references to one or more of the identified objects to the user for display, for example, in a drop-down menu 400 associated with the query field 450. In conjunction with the typeahead processes described previously, the references may be displayed to the user as the user inputs characters into the query field 450 as typeahead suggestions (via, for example, a client-side typeahead process). The querying user may then select among the typeahead suggestions to indicate that the object referenced in the suggestion should be retrieved by social-networking system 160. FIG. 5 illustrates an example search query input in query field 450 and various references to identified objects matching the search query input generated in response in drop-down menu 400 (although other suitable graphical user interfaces are possible). Although this disclosure describes applying the typeahead processes to search queries in a particular manner, this disclosure contemplates applying the typeahead processes to search queries in any suitable manner.

More information on search queries may be found in U.S. patent application Ser. No. 13/870,113, filed 25 Apr. 2013, U.S. patent application Ser. No. 14/284,318, filed 21 May 2014, and U.S. patent application Ser. No. 14/244,748, filed 3 Apr. 2014, each of which is incorporated by reference.

Identifying Objects

In particular embodiments, social-networking system 160 may receive a search query from a user of an online social network hosted by social-networking system 160. As an example and not by way of limitation, the search query may include a character string having one or more alphanumeric characters. In particular embodiments, in response to the received search query, social-networking system 160 may search a plurality of verticals 164 to identify a plurality of sets of objects in each vertical, respectively, that match the search query. In each vertical 164 of a plurality of verticals 164, social-networking system 160 may identify a set that includes one or more objects (e.g., users, photos, profile pages (or content of profile pages), etc.) from the vertical that satisfy or otherwise match the query. As an example and not by way of limitation, social-networking system 160 may search each vertical 164 to identify one or more objects that substantially match the character string of the search query input. Social-networking system 160 may identify matching objects in any suitable manner, such as, for example, by using one or more string-matching algorithms to match the character string with a string of characters associated with each of one or more of the objects. As an example and not by way of limitation, social-networking system 160 may match the text query "friends london" with photos of London stored in photos vertical P3 taken by friends of the user or users stored in users vertical P1 that live in London. In particular embodiments, for each vertical 164, a set of objects that substantially match the search query may be identified, and each identified object may correspond to a node of social graph 200. In particular embodiments, a set of identified objects for a particular vertical 164 may include a reference to or an identifier for each identified object of the vertical 164. As an example and not by way of limitation, a set of objects identified in response to a search query may not contain the identified objects but may include object identifiers, where each object identifier corresponds to an identified object from a vertical 164. Although this disclosure describes identifying particular objects in a particular manner, this disclosure contemplates identifying any suitable objects in any suitable manner.

In particular embodiments, the plurality of verticals 164 searched by social-networking system 160 may include M verticals 164, where M is any suitable positive integer (e.g., M=2, 3, 5, 10, 20, etc.). In the example of FIG. 3, M may be equal to 3, corresponding to the three verticals 164: users vertical P1, posts vertical P2, and photos vertical P3. In particular embodiments, a set of identified objects of an i-th vertical 164 of the M verticals 164 may include $N_i$ identified objects, where i is an integer from 1 to M, and $N_i$ is any suitable positive integer that represents the number of identified objects in the i-th vertical (e.g., $N_i$=1, 3, 5, 8, 10, 20, 50, 100, etc.). In particular embodiments, the number of identified objects in each set of objects may not necessarily be the same. As an example and not by way of limitation, in response to a search query, a set of user objects may include $N_1$=5 identified user objects, a set of photo objects may include $N_2$=10 identified photo objects, a set of post objects may include $N_3$=20 identified post objects, and a set of event objects may include $N_1$=10 identified event objects. In particular embodiments, the total number of identified objects may be equal to $\Sigma_{i=1}^{M} N_i$. For the previous example, the total number of identified objects is then $N_1+N_2+N_3+N_4$=45. In particular embodiments, each set of objects may include the same number ($N_i$=N) of identified objects, where N is any suitable positive integer (e.g., N=1, 3, 5, 8, 10, 20, 50, 100, etc.). If each set of objects includes the same number of identified objects, the total number of identified objects may be equal to M×N. As an example and not by way of limitation, for M=10 verticals 164 and N=25 identified objects in each set, the total number of identified objects is 10×25=250. In particular embodiments, the number of identified objects from each vertical 164 may not be fixed, may vary from search to search, or may depend on the number of search results to be sent to the querying user. As an example and not by way of limitation, the number of identified objects from each vertical 164 may be selected to ensure that a desired number of search results are sent to the querying user. If 8 search results are requested in response to a search query, each vertical 164 may return 5, 8, 10, 12, 15, or any suitable number of identified objects that ensures that a desired number of search results are returned. In particular embodiments, each vertical 164 may return more identified objects than the number of requested search results since some identified objects may be removed from consideration (e.g., due to privacy constraints). Although this disclosure describes and illustrates particular sets of objects that include particular numbers of identified objects, this disclosure contemplates any suitable set of objects that includes any suitable number of identified objects.

Ranking Identified Objects

In particular embodiments, social-networking system 160 may rank, for each set of identified objects from a vertical 164, each identified object in the set of identified objects. In particular embodiments, for each set of identified objects from vertical 164, ranking each identified object in the set of identified objects may include calculating for each identified object in the set of identified objects a vertical score based on a scoring algorithm associated with vertical 164. The identified objects may be scored on a variety of factors or properties, including, for example, relevance to the user, search history of the user, click-through rates (CTR) by other users, text similarity relative to the search query or other query constraints, social-graph affinity, social-graph information, other suitable factors, or any combination thereof. In particular embodiments, each vertical 164 may use a different scoring algorithm or a different set of factors for determining a vertical score. In particular embodiments, a vertical score for a particular vertical 164 may be based on a particular number of factors (e.g., 10, 50, 100, or any suitable number of factors). As an example and not by way of limitation, a vertical score for a particular vertical 164 may be based on 50 factors, and the vertical score may be determined by summing or combining scores associated with each of the 50 factors into a single vertical score.

In particular embodiments, scoring an identified object may include determining a number or a value that represents a relative relevance or a degree of matching of the identified object with respect to the search query. In particular embodiments, vertical scores for different verticals 164 may have the same ranges or may have different ranges. As an example and not by way of limitation, users vertical P1 may have a scoring range of 0.0 to 1.0, posts vertical P2 may have a scoring range of A to Z, and photos vertical P3 may have a scoring range of 0 to 1,000. For the example users vertical P1, an object having a vertical score close to or equal to 1.0 may represent a high-scoring object having a good match or a high degree of relevance to the search query. An object having a vertical score close to or equal to 0.0 may represent a lower-scoring object having a lower degree of matching or relevance to the search query. In particular embodiments, vertical scores for different verticals may have ranges that are adjusted or that change over time. In particular embodiments, vertical scores for different verticals may have similar statistical distributions or may have different statistical distributions. As an example and not by way of limitation, users vertical P1 may have a statistical distribution that is substantially uniform or flat across its scoring range, posts vertical P3 may have a normal (or Gaussian) distribution across its scoring range, and photos vertical P3 may have an exponential distribution across its scoring range. Although this disclosure describes particular vertical scores for identified objects determined in particular manners, this disclosure contemplates any suitable vertical scores for identified objects determined in any suitable manner.

In particular embodiments, ranking each identified object in a set of identified objects may include sorting or ranking the identified objects in the set of identified objects based on the calculated vertical scores. As an example and not by way of limitation, ranking identified objects in a set of identified objects may include arranging or ordering the identified objects based on their vertical scores. As an example and not by way of limitation, the objects in a set of identified objects may be arranged in order of their vertical scores with the identified object having the highest vertical score ranked first and the identified object having the lowest vertical score ranked last. The most relevant object (e.g., highest/best scoring) may be ranked highest, with the remaining objects having lower ranks commensurate with their score/relevance, such that the least relevant identified object is ranked lowest. In particular embodiments, the top-ranked identified object in a set of identified objects may be ranked first and may be an object having a highest vertical score of the objects in the set. Similarly, the second-ranked identified object from a set of identified objects may be ranked second and may be an object having a second-highest vertical score of the objects in the set. Although this disclosure describes ranking identified objects in particular manners based on particular vertical scores, this disclosure contemplates ranking identified objects in any suitable manner based on any suitable vertical scores.

In particular embodiments, after identified objects from a plurality of sets of identified objects are ranked, the sets of identified objects may be blended to form a set of blended search results. In particular embodiments, prior to blending the sets of identified objects, a score or ranking of one or more identified objects in a set of identified objects may be boosted. As an example and not by way of limitation, a ranking of an identified object may be increased (e.g., from being ranked tenth to being ranked second) based on one or more criteria. In particular embodiments, a score or ranking of one or more identified objects in a set of identified objects may be decreased. In particular embodiments, one or more identified objects in a set of identified objects may be removed from the set (e.g., based on a privacy constraint or a privacy check). As an example and not by way of limitation, an identified object may be checked for privacy control, and the privacy check may reveal that the object is subject to a privacy-based restriction and should not be returned as a search result. In particular embodiments, one or more objects not originally included in a set of identified objects may be added to the set. As an example and not by way of limitation, an advertisement or an object associated with a third party may be inserted into a set of identified objects.

Blending Search Results

Figure 6:
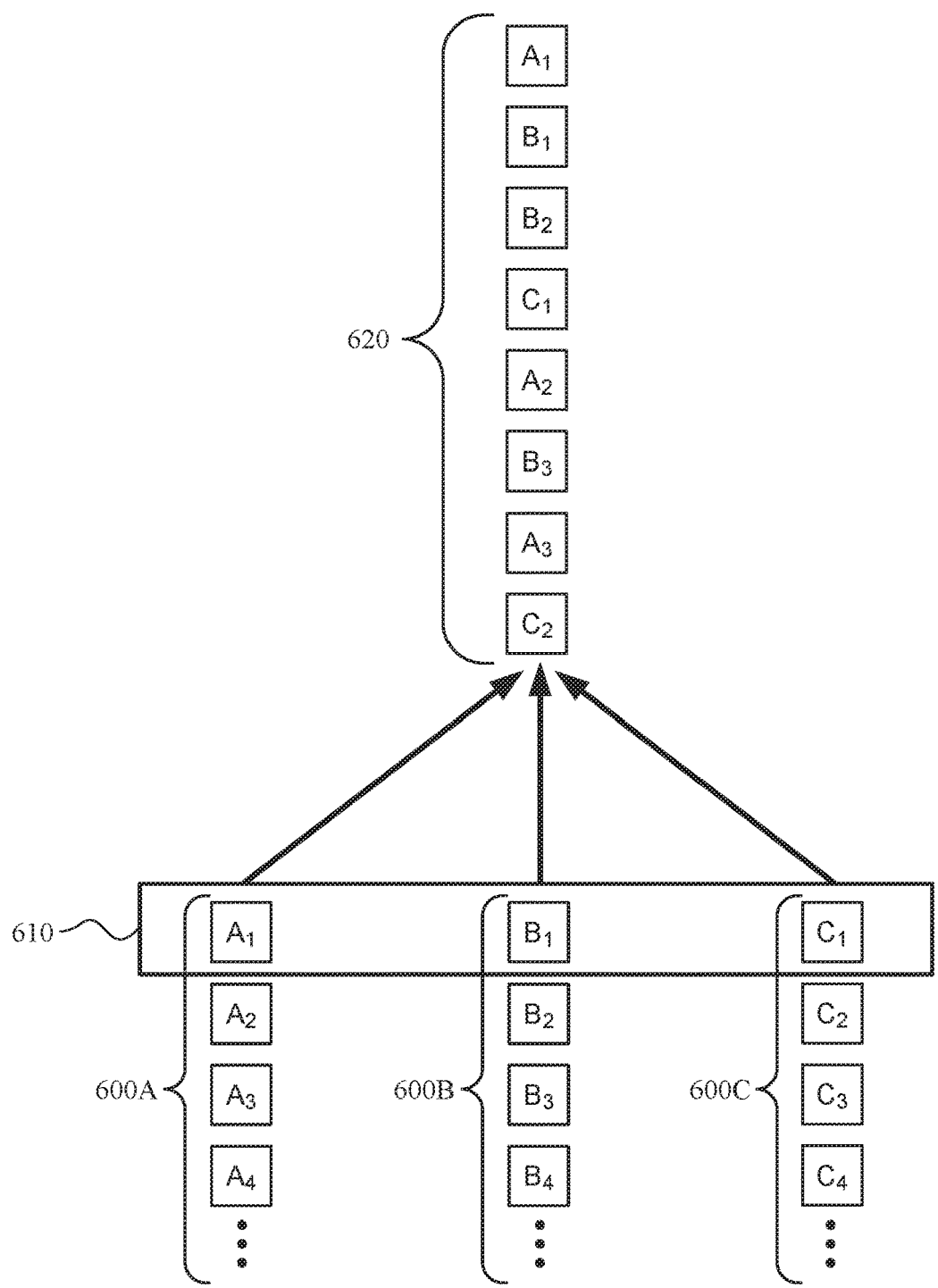
FIG. 6 illustrates an example of blending sets of identified objects to form a set of blended search results.

FIG. 6 illustrates an example of blending sets of identified objects to form a set of blended search results 620. In particular embodiments, social-networking system 160 may blend a plurality of sets of identified objects, each set of identified objects associated with a particular vertical 164, to form a set of blended search results 620. In particular embodiments, blending search results may refer to a process where a plurality of sets of identified objects are combined, or blended, to form a set of blended search results that may be returned in response to a search query. As an example and not by way of limitation, a set of six blended search results may be sent to the querying user's device as typeahead suggestions to be displayed on the user's device. For example, the six blended search results may be displayed in a drop-down menu 400, as illustrated in FIG. 5. In particular embodiments, each set of identified objects may be associated with a particular vertical 164. As an example and not by way of limitation, the sets of objects (600A, 600B, and 600C) in FIG. 6 may be associated with users vertical P1, posts vertical P2, and photos vertical P3, respectively, illustrated in FIG. 3. The example blending process illustrated in FIG. 6 may be performed by blender 320. Although this disclosure describes and illustrates particular processes for blending particular sets of identified objects, this disclosure contemplates any suitable processes for blending any suitable sets of identified objects.

In particular embodiments, any suitable number of M sets of identified objects (e.g., M=2, 3, 5, 10, 20, etc.) may be blended to form a set of blended search results. In the example of FIG. 6, three sets (M=3) of identified objects, 600A, 600B, and 600C, are blended into a set of blended search results 620. The identified objects in each set illustrated in FIG. 6 may have been scored and ranked as described above. In set 600A, object $A_1$ has the highest vertical score and is ranked first, and object $A_2$ has the second-highest vertical score and is ranked second. Box 610 indicates the top-ranked identified object in each set of identified objects. Object $A_1$ is the top-ranked identified object in set 600A, object $B_1$ is the top-ranked identified object in set 600B, and object $C_1$ is the top-ranked identified object in set 600C. Although this disclosure describes and illustrates blending particular numbers of sets of identified objects to form particular sets of blended search results, this disclosure contemplates blending any suitable numbers of sets of identified objects to form any suitable sets of blended search results.

In particular embodiments, a blending process may continue until all identified objects from the sets of identified objects have been combined into a set of blended search results. In such an example case, if M is the number of sets of identified objects, and the i-th set includes $N_i$ identified objects, where i is an integer from 1 to M, then the total number of objects in the set of blended search results is $\Sigma_{i=1}^{M} N_i$. If each set includes the same number ($N_i$=N) of identified objects, where N is any suitable positive integer (e.g., N=1, 3, 5, 8, 10, 20, 50, 100, etc.), the total number of objects in the set of blended search results is M×N. As an example and not by way of limitation, if there are three sets of identified objects (M=3) and each set includes N=10 identified objects, then the total number of objects in the set of blended search results is 30. In particular embodiments, a set of blended search results may include a threshold number of identified objects, and a blending process may continue to iterate until a particular threshold number of blended search results has been determined. In particular embodiments, the threshold number may be chosen to enhance search quality or to optimize the processing of search results. In particular embodiments, if M is the number of sets of identified objects, and the i-th set includes $N_i$ identified objects, where i is an integer from 1 to M, then the threshold number of identified objects may be less than or equal to $\Sigma_{i=1}^{M} N_i$. In particular embodiments, if each set includes the same number ($N_i=N$) of identified objects, where N is any suitable positive integer (e.g., N=1, 3, 5, 8, 10, 20, 50, 100, etc.), the threshold number of identified objects may be less than or equal to M×N. In the example of FIG. 6, the threshold number is eight, and the set of blended search results 620 includes eight objects ($A_1$, $B_1$, $B_2$, $C_1$, $A_2$, $B_3$, $A_3$, $C_2$). After these eight objects have been blended into a set of search results, the blending process may terminate, and the search results returned to the querying user may include references to one or more of these eight objects. In particular embodiments, a threshold number may not be fixed, may vary from search to search, or may depend on the number of search results to be sent to the querying user. As an example and not by way of limitation, the threshold number may be selected to ensure that a desired number of search results are sent to the querying user. If a search query should return eight search results, the threshold number of identified objects in the set of blended search results may be set to any suitable value greater than or equal to eight (e.g., 8, 10, 15, 20, etc.) that ensures that the desired number of search results are returned. In particular embodiments, the set of blended search results may include more objects than the number of requested objects since some objects may be removed from consideration (e.g., due to privacy constraints). Although this disclosure describes and illustrates particular sets of blended search results having particular numbers of objects, this disclosure contemplates any suitable sets of blended search results having any suitable numbers of objects.

In particular embodiments, blending the sets of identified objects may include an iterative process performed at least a threshold number of iterations. As an example and not by way of limitation, for a set of blended search results that includes a threshold number of identified objects equal to 10, the blending process may include 10 or more iterations. In the example of FIG. 6, for a threshold number equal to 8, the blending process illustrated in FIG. 6 may include 8 or more iterations. In particular embodiments, each iteration of an iterative blending process may include determining a blender score for each top-ranked identified object in each set of identified objects. In particular embodiments, each iteration of an iterative blending process may further include, for the top-ranked identified object having a highest blender score, adding the object to the set of blended search results 620; removing the object from its particular set of identified objects; and promoting a second-ranked identified object from the particular set of identified objects to the top-ranked identified object of the particular set of identified objects. Although this disclosure describes and FIG. 6 illustrates particular blending processes for forming particular sets of blended search results, this disclosure contemplates any suitable blending process for forming any suitable set of blended search results.

In particular embodiments, determining a blender score for a top-ranked identified object may include calculating a blender score based on a scoring algorithm. In particular embodiments, if a blender score has been calculated for a particular top-ranked identified object during a previous iteration, then determining a blender score for that top-ranked identified object may include retrieving the previously calculated blender score. As an example and not by way of limitation, for each top-ranked identified object, a blender score may only need to be calculated one time when that top-ranked identified object first appears in box 610. During subsequent iterations, if that top-ranked identified object is still in box 610 (e.g., the object has not been added to the set of blended search results 620), then its blender score may not need to be recalculated. In the example of FIG. 6, for the first iteration of the blending process, a blender score may be determined for each of the three top-ranked objects (e.g., $A_1$, $B_1$, and $C_1$) in box 610. For the second iteration of the blending process, a blender score may only need to be determined for object $A_2$, since blender scores for objects $B_1$, and $C_1$ were calculated in the previous iteration.

In particular embodiments, a blender score for each top-ranked identified object in each set of identified objects may be based on a scoring algorithm associated with the plurality of verticals 164. In particular embodiments, a scoring algorithm associated with the plurality of verticals 164 may refer to a scoring algorithm that may produce a valid blender score when it is applied to an identified object from each vertical 164 of the plurality of verticals 164. In particular embodiments, a blender score may be based on factors that are comparable across the plurality of verticals 164. As an example and not by way of limitation, a blender score may be based on a particular number of factors (e.g., 3, 5, 10, 15, or any suitable number of factors), where the factors may be applicable to each vertical 164 of the plurality of verticals 164. As an example and not by way of limitation, a blender score for each top-ranked identified object may be based on relevance to the user, text similarity relative to the search query, social-graph information, other suitable factors, or any suitable combination thereof. In particular embodiments, the number of factors used to determine a blender score may be less than the number of factors used to determine a vertical score for each vertical 164 of the plurality of verticals 164. In particular embodiments, some of the factors used to determine a blender score may be the same as some of the factors used to determine one or more vertical scores for one or more verticals 164. In particular embodiments, a blender scoring algorithm may produce different scores than a vertical scoring algorithm, and the scores associated with a blender scoring algorithm may be decoupled from the scores associated with a vertical scoring algorithm. In particular embodiments, a blender score may be based on a particular number of factors (e.g., 3, 5, 10, 15, or any suitable number of factors), and the blender score may be determined by summing or combining scores associated with each of the particular factors into a single blender score. Although this disclosure describes particular blender scores based on particular factors and particular numbers of factors, this disclosure contemplates any suitable blender scores based on any suitable factors and any suitable number of factors.

In particular embodiments, social-networking system 160 may access a social graph that includes a plurality of nodes (e.g., user nodes 202 or concept nodes 204) and a plurality of edges 206 connecting the nodes, each of the edges 206 between two of the nodes representing a single degree of separation between them. In particular embodiments, the nodes may include a first node corresponding to the first user (e.g., the querying user) of the online social network and a plurality of second nodes corresponding to a plurality of objects, respectively, each object being a user or concept associated with the online social network. In particular embodiments, for each top-ranked identified object, the blender score may be based at least in part on a degree of separation between the first node and a second node corresponding to the top-ranked identified object. As an example and not by way of limitation, a second node having a single degree of separation relative to the first node may have a higher blender score than another second node having a higher degree (e.g., second or third degree) of separation relative to the first node. In particular embodiments, for each top-ranked identified object, the blender score may be based at least in part on a social-graph affinity of the first user with respect to the top-ranked identified object. As an example and not by way of limitation, a blender score for a top-ranked identified object associated with a second user may be based on the social-graph affinity of the first user with respect to the second user. Although this disclosure describes particular blender scores based at least in part on particular social-graph information, this disclosure contemplates any suitable blender scores based at least in part on any suitable social-graph information.

As illustrated in the example of FIG. 6, for the first iteration of the blending process, a blender score may be determined for each of the three top-ranked objects (e.g., $A_1$, $B_1$, and $C_1$) in box 610. As an example and not by way of limitation, the blender scores for objects $A_1$, $B_1$, and $C_1$ may be 1510, 1440, and 1275, respectively. In the first iteration, top-ranked object $A_1$ from set 600A has the highest blender score of the three top-ranked objects in box 610. As described above, the top-ranked identified object with the highest blender score is added to the set of blended search results 620 and removed from its particular set of identified objects. In the example of FIG. 6, after the first iteration, object $A_1$ is added to blended search results 620 and removed from set 600A, and the second-ranked identified object ($A_2$) from set 600A is then promoted to become the top-ranked identified object of set 600A.

In the second iteration of the example blending process illustrated in FIG. 6, the three top-ranked objects in box 610 are $A_2$, $B_1$, and $C_1$. As described above, since blender scores for objects $B_1$, and $C_1$ were calculated in the previous iteration, they do not need to be calculated in the current iteration. The blender score for the newly added object $A_2$ may be calculated. As an example and not by way of limitation, the blender score for object $A_2$ may be 1175. For the second iteration of the example blending process, top-ranked object $B_1$ from set 600B has the highest blender score (1440). Object $B_1$ is added to blended search results 620 and removed from set 600B, and the second-ranked identified object ($B_2$) from set 600B is then promoted to become the top-ranked identified object of set 600B. After the second iteration, the set of blended search results 620 includes objects $A_1$ and $B_1$.

In the third iteration of the example blending process illustrated in FIG. 6, the three top-ranked objects in box 610 are $A_2$, $B_2$, and $C_1$. The blender score for the newly added object $B_2$ is then calculated. In particular embodiments, a blender score for a newly added object may be greater than a previously calculated blender score for an object that was added to blended search results 620. As an example and not by way of limitation, the blender score for object $B_2$ may be 1470, which is larger than the previously calculated blender score for object $B_1$ (1440). Since the factors or scoring algorithms used to determine vertical scores may be different from the factors or scoring algorithms used to determine blender scores, a blender score for a newly added object may be greater than a previously calculated blender score. In particular embodiments, if a blender score for a (n+1)-st object in a set of blended search results is greater than a blender score for a n-th object in the set, then the blender score for the a (n+1)-st object may be redefined or reassigned to be equal to the blender score for the n-th object. In the example of FIG. 6, the blender score for object $B_2$ may be changed from its originally calculated value of 1470 to 1440 so that it is equal to the blender score for object $B_1$. In particular embodiments, the blender scores for the objects of the set of blended search results may decrease monotonically. In particular embodiments, changing blender scores for objects as described here may help ensure that the blender scores for a set of blended search results decrease monotonically from the first blender score (e.g., blender score for object $A_1$ in FIG. 6) to the last blender score (e.g., blender score for object $C_2$ in FIG. 6) in a set of blended search results. In the example of FIG. 6, object $B_2$ is added to blended search results 620 and removed from set 600B, and the second-ranked identified object ($B_3$) from set 600B is then promoted to become the top-ranked identified object of set 600B.

At the beginning of the fourth iteration of the example blending process illustrated in FIG. 6, the three top-ranked objects in box 610 are $A_2$, $B_3$, and $C_1$. The blender score for the newly added object $B_3$ is then calculated (e.g., object $B_3$ may have a blender score of 980). Based on the blender scores for $A_2$, $B_3$, and $C_1$, top-ranked object $C_1$ from set 600C has the highest blender score (1275) of the objects in box 610. Object $C_1$ is added to blended search results 620 and removed from set 600B, and the second-ranked identified object ($C_2$) from set 600C is then promoted to become the top-ranked identified object of set 600C. The blending process illustrated in FIG. 6 may continue for a total of eight iterations until eight identified objects ($A_1$, $B_1$, $B_2$, $C_1$, $A_2$, $B_3$, $A_3$, $C_2$) are included in the set of blended search results 620. In particular embodiments, a blending process may terminate after a threshold number of blended search results have been added to the set of blended search results 620. As illustrated in FIG. 6, the blending process may terminate after eight blended search results have been determined. In particular embodiments, a blending process may terminate after a particular threshold number of blended search results (e.g., 1, 3, 5, 8, 10, 20, 50, 100, etc.) have been determined or after all of the identified objects have been disposed of or added to the set of blended search results.

In particular embodiments, the objects of the set of blended search results may be arranged in an order in which they were added to the set of blended search results. As an example and not by way of limitation, the first search result of a set of blended search results may be an identified object having a highest blender score (of the calculated blender scores) and may be the first identified object added to the set of blended search results. Similarly, the last search result of a set of blended search results may be an identified object having a lowest blender score (of the calculated blender scores) and may be the identified object that was added last to the set of blended search results. In the example of FIG. 6, the eight objects in the set of blended search results 620 may be arranged in the order in with they were added to the set of blended search results 620 with the object having the highest blender score ($A_1$) positioned first and the object with the lowest blender score ($C_2$) positioned last. Although this disclosure describes and FIG. 6 illustrates particular blended search results arranged in particular orders, this disclosure contemplates any suitable blended search results arranged in any suitable order.

In particular embodiments, identified objects from each set of identified objects may have a relative order in a set of blended search results that is the same as their order in their respective set of identified objects. In particular embodiments, the order of objects from a set of identified objects may be preserved when two or more of those objects are added to a set of blended search results. As illustrated in the example of FIG. 6, in the set of identified objects 600A, the order of the first three identified objects is $A_1$, $A_2$, $A_3$. After these three objects are added to the set of blended search results 620, their relative order ($A_1$, $A_2$, $A_3$) is the same so that object $A_1$ is positioned ahead of object $A_2$, which in turn is positioned ahead of object $A_3$. In particular embodiments, a set of blended search results 620 may include one or more intervening objects between successive objects from a particular set of identified objects, but the order of objects from the particular set of identified objects relative to one another may be preserved. In the example of FIG. 6, in the set of blended search results 620, objects $B_1$, $B_2$, and $C_1$ are located between objects $A_1$ and $A_2$, but the relative order of $A_1$ and $A_2$ is the same in the set of blended search results 620 as in their original set of identified objects 600A.

In particular embodiments, after forming a set of blended search results, social-networking system 160 may normalize the blender scores for the objects of the set of blended search results. In particular embodiments, normalizing blender scores for a set of blended search results may refer to scaling or mapping a set of blender scores so that they have a different range or a standard range. A standard scoring range (e.g., 0.0 to 1.0, or 0 to 100) may be used so that a set of blender scores can be readily compared to other scores or processed by other types of blending or comparison processes. As an example and not by way of limitation, a set of blended search results may have the following blender scores: 1250, 1125, 950, 300, and 175. Social-networking system 160 may scale these scores to a range of 0 to 100. For such an example set of blender scores, after normalization, the respective normalized scores may be 100, 90, 76, 24, and 14. Although this disclosure describes particular blender scores being normalized in a particular manner, this disclosure contemplates any suitable blender scores being normalized in any suitable manner.

In particular embodiments, after forming a set of blended search results 620, social-networking system 160 may make one or more adjustments to blender scores or to the rankings or the composition of a set of blended search results 620 before presentation to the querying user. In particular embodiments, a blender score or a ranking of one or more identified objects in a set of blended search results 620 may be boosted prior to sending the set of blended search results 620 to the first user. As an example and not by way of limitation, social-networking system 160 may boost object $B_2$ in blended search results 620 from the third position to the first (or top) position, resulting in object $A_1$ moving into the second position and object $B_1$ moving into the third position. In particular embodiments, a blender score or a ranking of one or more identified objects in a set of blended search results 620 may be reduced. In particular embodiments, a redundant identified object (e.g., an identified object that is substantially the same as another identified object) may be dropped from a set of blended search results 620. In particular embodiments, one or more identified objects in a set of blended search results 620 may be removed from the set (e.g., based on a privacy constraint or a privacy check). As an example and not by way of limitation, an identified object may be checked for privacy control, and the privacy check may reveal that the object is subject to a privacy-based restriction and should not be returned as a search result. In particular embodiments, one or more objects not originally included in a set of blended search results 620 may be added to the set. As an example and not by way of limitation, an advertisement or an object associated with a third party may be inserted into a set of blended search results 620. In particular embodiments, adjustments may be made to a set of blended search results 620 to increase the diversity of the search results. As an example and not by way of limitation, if a set of blended search results 620 includes more than a particular amount (e.g., greater than 50%) of identified objects from a particular vertical 164, then additional identified objects may be added to the set or one or more identified objects associated with the particular vertical may be removed from the set or may have their blender score or ranking reduced. As an example and not by way of limitation, if a set of blended search results 620 is not well mixed or distributed (e.g., the top five results are all from the same vertical 164), then one or more of the identified objects in the set may be redistributed within the set or removed from the set. Although this disclosure describes particular adjustments to particular blender scores or to particular rankings or compositions of particular blended search results, this disclosure contemplates any suitable adjustments to any suitable blender scores or to any suitable rankings or compositions of any suitable blended search results.

Sending Search Results

In particular embodiments, social-networking system 160 may send, responsive to a search query, a set of blended search results to the first user for display. In particular embodiments, each search result may include a reference to a corresponding identified object. The search results may be sent to the user, for example, in the form of a list of links on a search-results webpage, each link being associated with a different webpage that contains some of the identified resources or content. In particular embodiments, each link in the search results may be in the form of a Uniform Resource Locator (URL) that specifies where the corresponding webpage is located and the mechanism for retrieving it. In particular embodiments, each search result may include a link to a profile page and a description or summary of the profile page (or the node corresponding to that page). When generating the search results, social-networking system 160 may generate one or more snippets for each search result, where the snippets are contextual information about the target of the search result (i.e., contextual information about the social-graph entity, profile page, or other content corresponding to the particular search result). In particular embodiments, each search result may include additional information associated with a corresponding object, such as for example, a thumbnail photo or a snippet of text associated with the object. The search results may be presented and sent to the querying user as a search-results page. Social-networking system 160 may send the search-results webpage to the web browser 132 on the user's client system 130. In particular embodiments, social-networking system 160 may receive a selection of an object of the search results from the first user, and social-networking system 160 may send the object to the first user. As an example and not by way of limitation, the user may click on the URL links or otherwise select the content from the search-results webpage to access the content from social-networking system 160 or from an external system (such as, for example, third-party system 170), as appropriate. In particular embodiments, social-networking system 160 may only send search results having a score/rank over a particular threshold score/rank. As an example and not by way of limitation, social-networking system 160 may only send results corresponding to the top ten blender scores or results having blender scores over a particular threshold blender score. Although this disclosure describes sending particular search results in a particular manner, this disclosure contemplates sending any suitable search results in any suitable manner.

Figure 7:
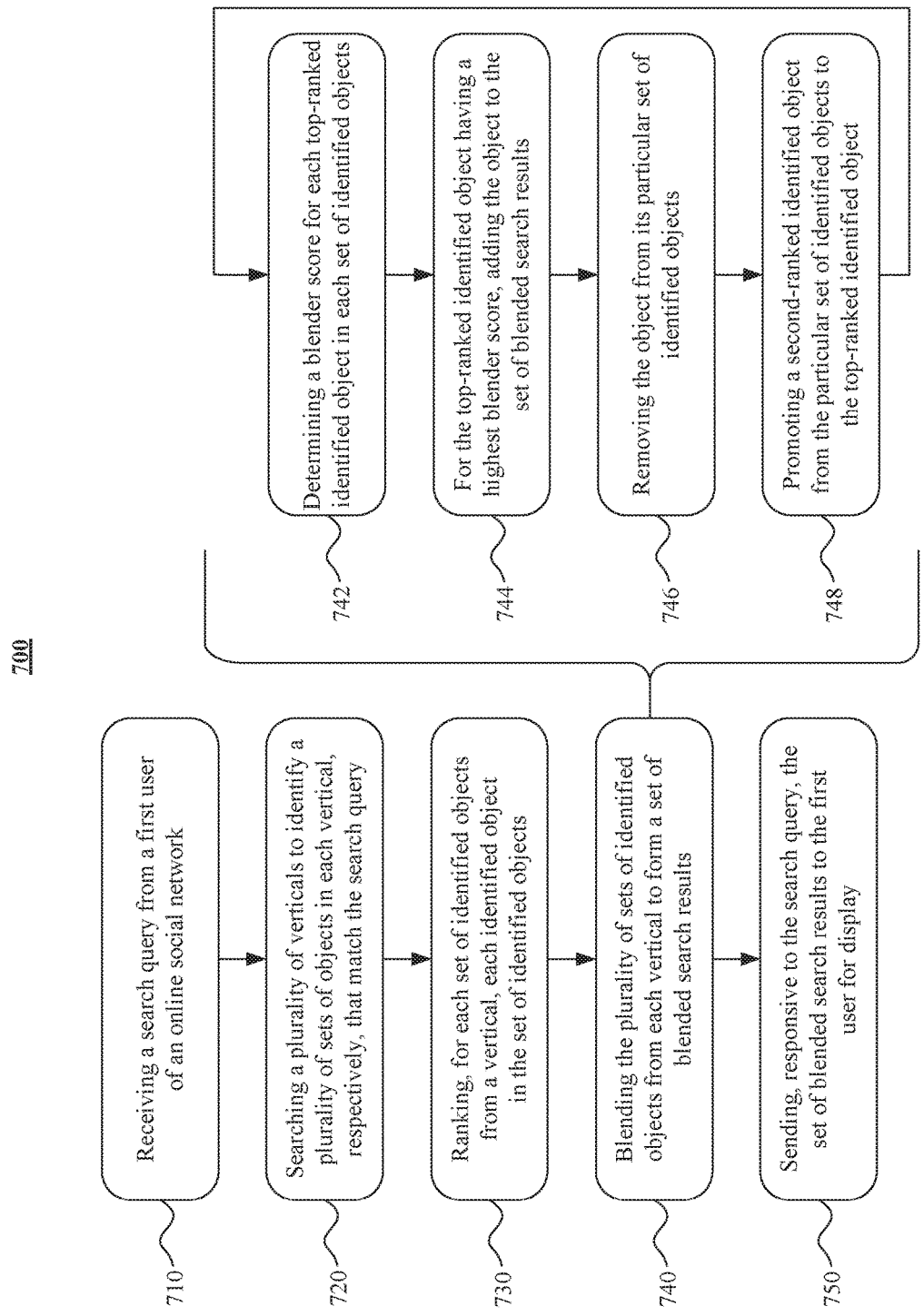
FIG. 7 illustrates an example method for blending identified objects.

FIG. 7 illustrates example method 700 for blending identified objects. The method may begin at step 710, where social-networking system 160 may receive a search query from a first user of an online social network. At step 720, social-networking system 160 may search a plurality of verticals 164 to identify a plurality of sets of objects in each vertical 164, respectively, that match the search query. In particular embodiments, each vertical 164 may store one or more objects associated with the online social network. At step 730, social-networking system 160 may rank, for each set of identified objects from a vertical 164, each identified object in the set of identified objects. In particular embodiments, ranking a set of identified objects may include determining a score for each identified object in the set and ordering the identified objects according to their scores. At step 740, social-networking system 160 may blend the plurality of sets of identified objects from each vertical 164 to form a set of blended search results. In particular embodiments, the set of blended search results may include a threshold number of identified objects. In particular embodiments, the blending may include an iterative process performed at least the threshold number of iterations. Each iteration of the iterative blending process may include one or more of steps 742, 744, 746, and 748 of FIG. 7. At step 742, social-networking system 160 may determine a blender score for each top-ranked identified object in each set of identified objects. For the top-ranked identified object having a highest blender score, at step 744, social-networking system 160 may add the object to the set of blended search results, and at step 746, social-networking system 160 may remove the object from its particular set of identified objects. At step 748, social-networking system 160 may promote a second-ranked identified object from the particular set of identified objects to the top-ranked identified object of the particular set of identified objects. In particular embodiments, steps 742, 744, 746, and 748 of the iterative blending process may be repeated at least the threshold number of iterations. At step 750, social-networking system 160 may send, responsive to the search query, the set of blended search results to the first user for display, at which point the method may end. Particular embodiments may repeat one or more steps of method 700 of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for blending identified objects including the particular steps of the method of FIG. 7, this disclosure contemplates any suitable method for blending identified objects including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 8:
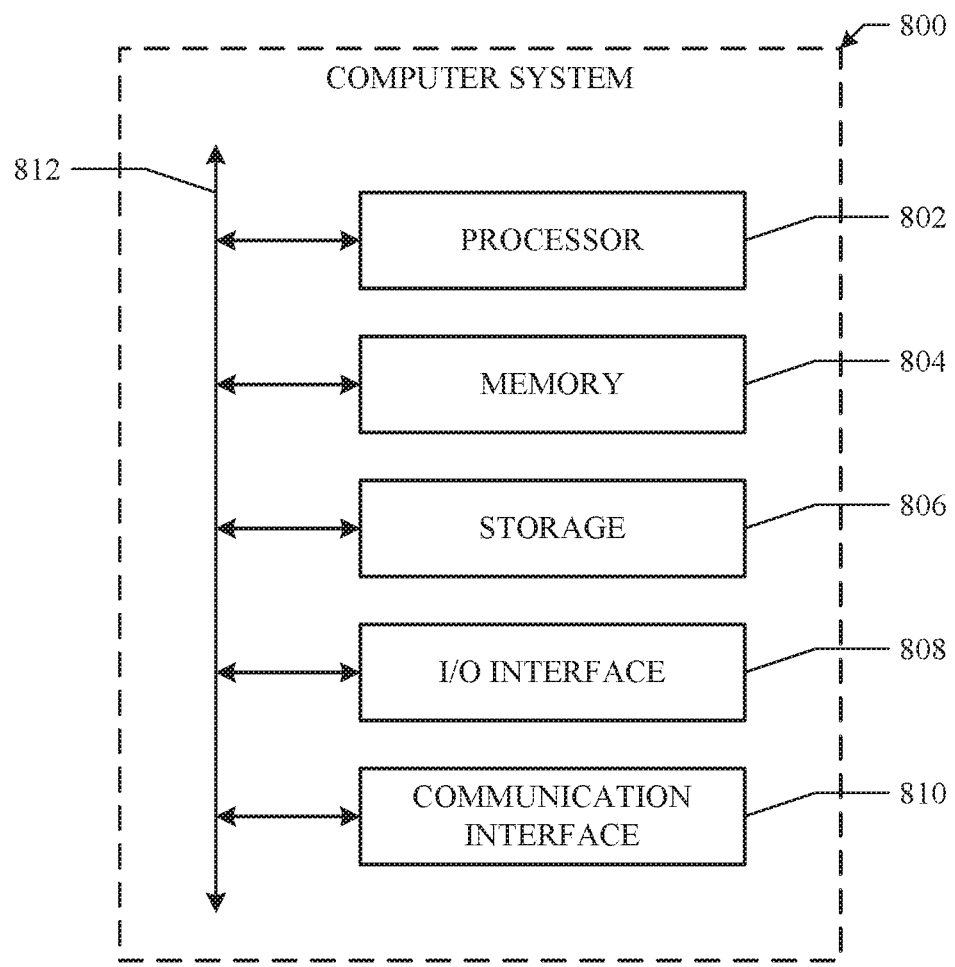
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing systems:
   receiving, from a client system associated with a first user, a search query comprising one or more n-grams;
   searching, by one or more of the computing systems, a plurality of verticals to identify a plurality of sets of objects in each vertical, respectively, that match the search query, wherein each vertical stores one or more objects of a particular object-type;
   generating, by one or more of the computing systems, a set of blended search results by blending the plurality of sets of identified objects from each vertical;
   determining, by one or more of the computing systems, whether a number of the search results corresponding to identified objects of a first object-type from the first vertical of the plurality of verticals are greater than a threshold proportion of a total number of search results in the blended search results;
   adding, by one or more of the computing systems responsive to determining that the number of the search results corresponding to identified objects of the first object-type are greater than the threshold portion of the search results in the blended search results, at least one object of a second object-type from a second vertical of the plurality of verticals to the set of blended search results, wherein the second object-type of the second vertical is different from the first object-type of the first vertical; and
   sending, to the client system responsive to the search query, instructions for presenting the set of blended search results.

2. The method of claim 1, wherein the particular object-type is selected from a group consisting of: a user, a photo, a post, a page, an application, an event, a location, and a user group.

3. The method of claim 1, further comprising removing at least one identified object from the set of blended search results responsive to determining that the number of the search results corresponding to identified objects of the first object-type are greater than the threshold portion of the search results in the blended search results, wherein the removed identified object is from the first vertical.

4. The method of claim 1, further comprising redistributing the identified objects in the set of blended search results responsive to determining that the number of the search results corresponding to identified objects of the first object-type are greater than the threshold portion of the search results in the blended search results.

5. The method of claim 1, wherein the threshold proportion is specified as a percentage, a ratio, a faction, a decimal, a quotient, or an integer.

6. The method of claim 1, further comprising:
   receiving, from the client system, a selection of a particular search result; and
   sending, to the client system responsive to the selection, an identified object corresponding to the particular search result.

7. The method of claim 1, wherein generating a set of blended search results by blending the plurality of sets of identified objects from each vertical comprises performing a number of iterations until the set of blended search results comprises at least a threshold number of identified objects, each iteration comprising:
   determining a blender score for each top-ranked identified object in each set of identified objects; and
   for the top-ranked identified object having a highest blender score:
       adding a search result corresponding to the identified object to the set of blended search results;
       removing the identified object from its particular set of identified objects; and
       promoting a second-ranked identified object from the particular set of identified objects to the top-ranked identified object of the particular set of identified objects.

8. The method of claim 7, further comprising reducing the blender score of at least one identified object of the set of blended search results responsive to determining that greater than the threshold proportion of the search results in the blended search results correspond to identified objects from the first vertical, wherein the at least one identified object is from the first vertical.

9. The method of claim 7, wherein the identified objects of the set of blended search results are arranged in an order in which they were added to the set of blended search results, and wherein the blender scores for the objects of the set of blended search results decrease monotonically.

10. The method of claim 1, wherein identified objects from each set of identified objects have a relative order in the set of blended search results that is the same as their order in their respective set of identified objects.

11. The method of claim 1, wherein the at least one object added from a second vertical is associated with a third-party content object provider.

12. The method of claim 1, further comprising ranking, for each set of identified objects in each respective vertical, each identified object in the set of identified objects.

13. The method of claim 12, wherein, for each set of identified objects from a vertical, ranking each identified object in the set of identified objects comprises:
    calculating for each identified object in the set of identified objects a vertical score based on a scoring algorithm associated with the vertical; and
    ranking the identified objects in the set of identified objects based on the calculated vertical scores.

14. The method of claim 1, further comprising removing at least one identified object from the set of blended search results based on a privacy constraint.

15. The method of claim 1, further comprising removing at least one identified object from the set of blended search results based on determining that the identified object is substantially the same as another identified object of the set of blended search results.

16. One or more computer-readable non-transitory storage media embodying software that is operable when executed to:
    receive, from a client system associated with a first user, a search query comprising one or more n-grams;
    search, by one or more of the computing systems, a plurality of verticals to identify a plurality of sets of objects in each vertical, respectively, that match the search query, wherein each vertical stores one or more objects of a particular object-type;
    generate, by one or more of the computing systems, a set of blended search results by blending the plurality of sets of identified objects from each vertical;
    determine, by one or more of the computing systems, whether a number of the search results corresponding to identified objects of a first object-type from the first vertical of the plurality of verticals are greater than a threshold proportion of a total number of search results in the blended search results;
    add, by one or more of the computing systems responsive to determining that the number of the search results corresponding to identified objects of the first object-type are greater than the threshold portion of the search results in the blended search results, at least one object of a second object-type from a second vertical of the plurality of verticals to the set of blended search results, wherein the second object-type of the second vertical is different from the first object-type of the first vertical; and
    send, to the client system responsive to the search query, instructions for presenting the set of blended search results.

17. The media of claim 16, wherein the particular object-type is selected from a group consisting of: a user, a photo, a post, a page, an application, an event, a location, and a user group.

18. The media of claim 16, wherein the software is further operable when executed to remove at least one identified object from the set of blended search results responsive to determining that the number of the search results corresponding to identified objects of the first object-type are greater than the threshold portion of the search results in the blended search results, wherein the removed identified object is from the first vertical.

19. The media of claim 16, wherein the software is further operable when executed to redistribute the identified objects in the set of blended search results responsive to determining that the number of the search results corresponding to identified objects of the first object-type are greater than the threshold portion of the search results in the blended search results.

20. A system comprising: one or more processors; and a non-transitory memory coupled to the processors comprising instructions executable by the processors, the processors operable when executing the instructions to:
    receive, from a client system associated with a first user, a search query comprising one or more n-grams;
    search, by one or more of the computing systems, a plurality of verticals to identify a plurality of sets of objects in each vertical, respectively, that match the search query, wherein each vertical stores one or more objects of a particular object-type;
    generate, by one or more of the computing systems, a set of blended search results by blending the plurality of sets of identified objects from each vertical;
    determine, by one or more of the computing systems, whether a number of the search results corresponding to identified objects of a first object-type from the first vertical of the plurality of verticals are greater than a threshold proportion of a total number of search results in the blended search results;
    add, by one or more of the computing systems responsive to determining that the number of the search results corresponding to identified objects of the first object-type are greater than the threshold portion of the search results in the blended search results, at least one object of a second object-type from a second vertical of the plurality of verticals to the set of blended search results, wherein the second object-type of the second vertical is different from the first object-type of the first vertical; and
    send, to the client system responsive to the search query, instructions for presenting the set of blended search results.

* * * * *